Aug. 17, 1937.  A. E. HAAS ET AL  2,090,197
GASOLINE TANK
Filed March 15, 1935  2 Sheets-Sheet 1

Inventors
ALBERT E. HAAS and
GEORGE H. CLAY.

By Eugene E. Stevens
Attorney

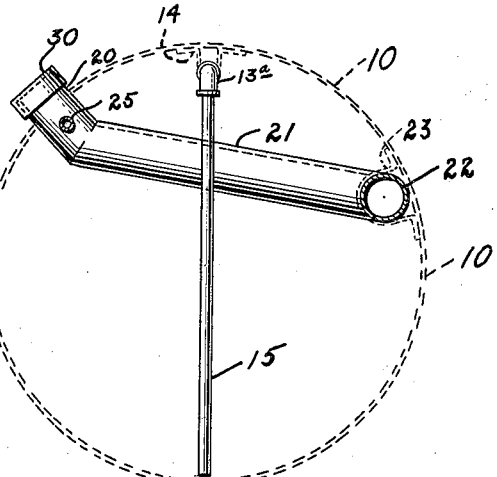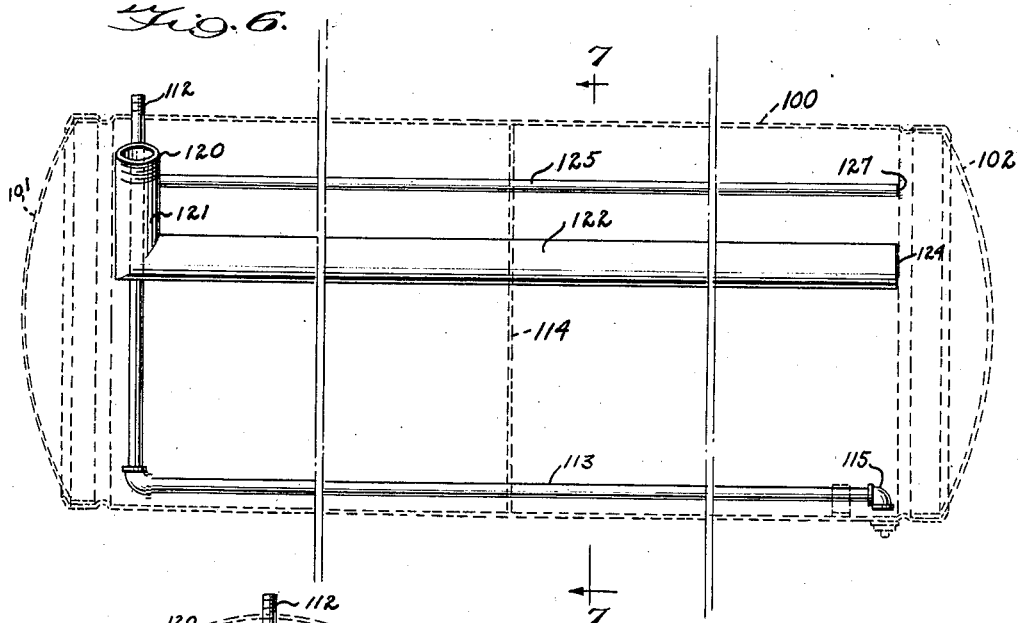

Patented Aug. 17, 1937

2,090,197

UNITED STATES PATENT OFFICE 2,090,197

GASOLINE TANK

Albert E. Haas and George H. Clay, Kansas City, Mo., assignors to American Safety Tank Co., Kansas City, Mo., a corporation of Missouri Application March 15, 1935, Serial No. 11,364

7 Claims. (Cl. 220—86)

Our invention relates to tanks for combustible fluids and more particularly to improved liquid fuel tanks for vehicles, with particular reference to motor vehicles such as automobiles, trucks and the like, although readily adaptable to other vehicles.

While the tank which forms the subject matter of this invention has many applications and is susceptible of being used with any device that necessitates the use of a liquid fuel tank and has a fuel consuming apparatus such as a burner, internal combustion engine, or the like, it is obvious that its most general application is to an automobile and that the general type of fuel will be gasoline.

It is well known that by far the greatest damage incident to the overturning of an automobile or an automobile wreck, arises from fire which is caused by gasoline leaking from the inlet of the gasoline tank and coming into contact with the hot exhaust pipe or other heated portions of the engine. The fire thus caused spreads quickly, is hard to extinguish, and generally results in the vehicle becoming a total loss. It is well known also that in such an event, the occupants of the vehicle are frequently pinned beneath the car and burned to death, or at least severely burned, before they can be rescued.

With the foregoing in mind, we have endeavored to devise a tank from which gasoline, or other liquid fuel, will not leak when the vehicle overturns. As the great majority of fires connected with automobile wrecks are caused primarily by such leakage, we believe that by producing a leak proof tank, that a great many lives will be saved and that a great deal less property damage will result from automobile wrecks.

Among the objects of our invention is to provide a fuel tank which will not leak when the normal position of the tank is changed by reason of a wreck or other event.

A further object is to provide a tank which will minimize the fire hazard in the event the vehicle is wrecked or overturned.

A further object is to provide a novel and improved cap for the tank.

A further object is to provide a novel tank and cap.

A further object is to provide a tank which cannot be completely filled with fuel, that is which can only be filled to a predetermined level, and which will have at all times at least a certain amount of air therein.

Other objects and advantages reside in the particular forms of our invention, combination and arrangement of the various parts, in the particular details of structure, and in the particular modes of operation, all of which will be readily apparent to those skilled in the art upon reference to the attached drawings, detailed description and claims which form parts of this disclosure.

In the drawings:

Fig. 1 is a top plan view of one form of the invention,

Fig. 2 is a side elevation thereof,

Fig. 3 is a vertical section taken on the line 3—3 of Fig. 2,

Fig. 4 is a vertical section through the upper end of the filling tube and cap,

Fig. 5 is a horizontal section taken on the line 5—5 of Fig. 4,

Fig. 6 is a side elevation of a modification of the device; and

Fig. 7 is a vertical section taken on the line 7—7 of Fig. 6.

The present specification discloses two forms of the invention, the first of which is disclosed by Figures 1, 2, and 3 of the drawings, and the second form of which is disclosed by Figures 6 and 7. In connection with both forms of the invention a novel type of filler cap is used which is disclosed by Figures 4 and 5.

Referring to the form of invention disclosed by Figures 1, 2, and 3, and with like reference characters designating identical parts, the reference character 10 indicates an automobile tank which is adapted to be placed upon one side of an automobile, motor-bus, truck, or the like in substantially horizontal position. No claim is made to any particular form of tank per se as the invention resides in certain appurtenances thereof to be described hereafter and which are equally applicable to any liquid fuel tank.

A fuel conduit 13 leads from the tank 10 to any suitable apparatus for consuming the fuel, such as an automobile engine (not shown). The fuel line 13 passes through the end wall 10$^b$ near the fuel inlet of the tank 10 adjacent the top thereof and extends across the interior of the tank to a point adjacent the opposite end wall 10$^a$ of the same. The line 13 is supported from the tank top by any suitable means 14 and its inner end portion is downwardly bent as at 13$^a$ to form a substantially perpendicular section 15 which opens into the tank adjacent the bottom of the same.

The tank 10 is filled by means of a filling pipe 20 which is located within the tank and is substantially L-shaped in plan, with the shorter leg or lateral portion 21 extending through the upper side wall to the exterior of the tank adjacent the top thereof. A cap 30 is adapted to be attached to the open end of the leg 21 of the pipe 20. The longer leg 22 is positioned along the length of the tank 10 in substantial parallelism with the top thereof and is attached to the tank by any suitable supporting means 23. This leg 22, as will be apparent from Figures 1 and 2, extends substantially the major portion of the length of the tank 10 and has an open inner end spaced from the adjacent end 10ª of the tank. A second or vent pipe 25 is connected with the filling pipe and opens into the shorter leg 21 at a point close to the side wall of the tank through which the leg 21 is extended and said vent pipe 25 extends substantially to the opposite end of the tank, being attached thereto by any suitable supporting means 26, where it opens into the same as at 27. The vent pipe 25 is disposed a sufficient distance below the top of the tank to form a non-fillable void sufficient to cause the inner ends of both the filling pipe and the vent pipe to extend above the liquid level within the tank when the latter is tipped in case of overturn of the vehicle.

As we have stated above, this form of the tank is adapted to be placed either across the frame of a vehicle with its axis substantially at right angles to the longitudinal axis of the vehicle, or to be placed on the side of a vehicle in substantially a horizontal position with the long axis of the tank extending substantially parallel to the longitudinal axis of the vehicle.

This form of tank is adapted to be placed either across the frame of a vehicle with its axis substantially at right angles to the longitudinal axis of the vehicle; or to be placed on the side of a vehicle in substantially a horizontal position with the longitudinal axis of the tank substantially parallel to the longitudinal axis of the vehicle.

In the case of the cross mount installation (where the longitudinal axis of the tank is at right angles to the longitudinal axis of the vehicle) if the vehicle be over-turned or tilted to its right side it is apparent that the filling outlet will be uppermost and that no leakage will occur. On the other hand if the vehicle be tilted or overturned to its left side it is seen that the open end of the filler pipe and the open end of the vent pipe within the tank will be above the surface of the liquid or the fuel, and that no fuel will run down the same to the outside outlet. Any fuel that might be trapped in either the filling pipe or the vent pipe is prevented from escaping by means of the novel cap used on the tank.

In the case of the side mount tank or those tanks mounted on the side of a vehicle with their longitudinal axis parallel to the longitudinal axis of the vehicle the action of the tank in case of upset or end over is essentially the same principle as described above. In any position where leakage would occur from the tank the ends of the filling neck, vent pipe or fuel line are protected by the non-fillable void against leakage of fuel. The pipe 25 serves as a vent and serves to prevent the tank from being filled above the level of the end 27 thereof to provide the non-fillable void above noted, when the tank is in normal position.

As the tank is being filled the air in the tank is displaced by the incoming fuel, and this air can escape only through the vent pipe 25. Therefore, as soon as the mouth 27 of the pipe 25 is covered no more fuel can be placed in the tank notwithstanding the fact that the tank is not completely filled. This procedure establishes the non-fillable void which keeps the ends of the filling neck and vent pipe out of the fuel in case of overturn when the outside opening of these pipes is lower than the level of the fuel in the tank.

The modification of the invention disclosed by Figs. 6 and 7 discloses a tank 100 which is adapted to be placed across the frame of the vehicle at right angles to the long axis thereof. A fuel line 112 leads from the engine (not shown) and enters the top of the tank 100 adjacent the end 101 thereof and extends substantially the length of the tank as at 113 where it turns downwardly to a point adjacent the bottom of the opposite end and opens into the same as at 115. An apertured partition 114 may be placed in the tank 100 and serves to support the portion 115 of the pipe 112. The tank is filled by means of a filling pipe 120 which extends angularly through an upper side wall of the tank and inwardly thereof a short distance. As in the modification first described, the filling pipe 120 is substantially L-shaped, having a shorter leg or lateral portion 121 and a longer leg 122. The longer leg 122 extends through the partition 114 and substantially the major length of the tank 100 at the upper portion thereof and has its inner end 124 spaced from the end 102. The smaller or vent pipe 125, corresponding to the pipe 25 in the other form of the invention, extends parallel to the leg 122 as at 127, at a point in substantially the same vertical plane as the end 124 of the leg 122. Both the pipe 125 and the leg 122 are supported by the partition 114, or the partition may be eliminated and any other suitable supporting means substituted.

The operation of this form of the invention is substantially the same as the form previously described, and it will be noted that whether the car is overturned on its right or left side it will be impossible for any gasoline in the tank proper to flow into either the pipes 120 or 125 or into the supply line 113.

In Figs. 4 and 5 is shown a novel type of cap for the tank illustrated. The outer ends of the filling pipe 20 are inwardly turned to form portions 20ª which are formed to provide cut away portions 20ᵇ. The cap 30 is provided with a flange 31 which fits over the end of the filler pipe 20 (or 120). The usual vent hole 32 is provided centrally of the top of the cap 30 and any suitable washer, or the like 33 may be carried by the cap to prevent leakage of gasoline at the joint between the same and the end of the pipe 20. A member 34ª having laterally extending spring fingers 34 which are adapted to be seated beneath the inwardly turned portions 20ª of the pipe 20 is carried by the top of the cap. A vent 35 is provided in the member 34ª between the spring fingers to coincide with the vent 32 in the cap. The vents 32 and 35 open into a tube 36 which is soldered or otherwise secured to the member 34ª and depends downwardly therefrom and axially of the same and the top of the cap. The lower end of the tube 36 is provided with a lateral opening 37 and the extreme end is soldered or otherwise secured to a cup-shaped member 38 substantially axially thereof.

It is in the tube 36, aperture 37 and cup 38 that the novelty of the cap 30 is found. It is well known that there is a necessity for a vent hole in most automobile tanks to permit the gasoline to be drawn off. We have found that in the event that a tank such as we have described above is overturned or tilted, there is a likelihood that a portion of gasoline which may be in either the leg 22 of the filling pipe 20 or vent 25 (or 122 or the vent 125), will leak out through the vent hole and create a dangerous condition. For that reason we have designed a cap which, while providing the necessary vent to the tank, will not permit the leakage of gasoline through the vent in the event that the tank is overturned. The operation is simplicity itself and is based on the vacuum principle which is demonstrated best by holding fluid in a tube simply by closing the upper end thereof, that is, when the tank is turned upside down and gasoline fills the tube 36, the attempted flow of the gasoline out of the tube creates a vacuum above the fuel level in the tank which exerts a sufficient pull to prevent the escape of gasoline. We have discovered that a tube such as 36 is necessary to enable the vacuum to exert enough pull to prevent the gasoline from escaping, it being well known that the vacuum in the usual tank does not prevent the escape of gasoline from the usual vent hole.

While we have shown and described two embodiments of our invention, it is to be understood that it is susceptible of other expressions and embodiments without departing from the spirit of the invention and that the forms of invention shown and described are intended to be illustrative rather than limitive. That is, it is obvious that the filling pipes could be other than L-shaped and that the vent pipe could be otherwise positioned in the tank as long as the results obtained by applicants are accomplished.

We claim:

1. A liquid fuel tank for motor vehicles including a closed tank adapted to be normally supported on a vehicle in substantially horizontal position, a filling pipe located within the tank and having a leg portion extending the major portion of the length of the tank at the upper portion thereof and provided at one end with a lateral portion extending to the exterior of the tank, the other end of the leg portion being open and located adjacent to and spaced from one end of the tank, and a vent pipe arranged in the tank and connected at one end with the filling pipe and extending therefrom to a point adjacent said end of the tank and located a sufficient distance below the top of the tank to form a non-fillable void sufficient to cause the inner ends of both the filling pipe and the vent pipe to extend above the liquid level within the tank when the tank is inverted.

2. A liquid fuel tank for motor vehicles including a closed tank adapted to be normally supported on a vehicle in substantially horizontal position, a filling pipe located within the tank and provided adjacent one end of the tank with a lateral portion extending to the exterior of the tank, said filling pipe having a leg portion extending along the upper portion of the tank to a point adjacent the other end of the same and having an open inner end spaced from the adjacent end of the tank, and a vent pipe arranged within the tank and connected with the filling pipe and extending to a point adjacent the end of the tank at which the open end of the filling pipe is located and disposed a sufficient distance below the top of the tank to form a non-fillable void sufficient to cause the inner ends of both the filling pipe and the vent pipe to extend above the liquid level within the tank when the latter is inverted.

3. A liquid fuel tank for motor vehicles including a closed tank adapted to be normally supported on a vehicle in substantially horizontal position, a filling pipe located within the tank and having a leg portion extending the major portion of the length of the tank at the upper portion thereof and provided at one end with a lateral portion extending to the exterior of the tank, the other end of the leg portion being open and located adjacent to and spaced from one end of the tank, a vent pipe arranged within the tank and connected at one end with the lateral portion of the filling pipe and extending therefrom to a point adjacent said end of the tank and located a sufficient distance below the top of the tank to form a non-fillable void sufficient to cause the inner ends of both the filling pipe and the vent pipe to extend above the liquid level within the tank when the tank is inverted.

4. A liquid fuel tank for motor vehicles including a closed tank adapted to be normally supported on a vehicle in substantially horizontal position, a filling pipe located within the tank and provided adjacent one end of the tank with a lateral portion extending to the exterior of the tank, said filling pipe having a leg portion extending along the upper portion of the tank to a point adjacent the other end of the same and having an open inner end spaced from the adjacent end of the tank, and a vent pipe arranged in the tank and connected to the lateral portion of the filling pipe and extending therefrom to a point adjacent the opposite end of the tank and having its inner end located a sufficient distance below the top of the tank to form a non-fillable void sufficient to cause the inner end of both the filling pipe and the vent pipe to extend above the liquid level in the tank when the tank is inverted.

5. A liquid fuel tank for motor vehicles including a closed tank adapted to be normally supported on a vehicle in substantially horizontal position, a filling pipe arranged within the tank and having a lateral portion located at one end of the tank and extending to the exterior thereof, said filling pipe having a leg portion extending in substantial parallelism with the top of the tank to the other end thereof and having an open inner end spaced from the adjacent end of the tank, and a vent pipe arranged within the tank and connected with the lateral portion of the filling pipe and extending to a point adjacent the opposite end of the tank and located a sufficient distance below the top of the tank to form a non-fillable void sufficient to cause the inner ends of both the filling pipe and the vent pipe to extend above the liquid level within the tank when the tank is inverted.

6. A liquid fuel tank for motor vehicles including a closed tank adapted to be normally supported on a vehicle in substantially horizontal position, a filling pipe located within the tank and provided adjacent one end of the tank with a lateral portion extending to the exterior of the tank, said filling pipe having a leg portion extending along the upper portion of the tank to a point adjacent the other end of the same and having an open inner end spaced from the adjacent end of the tank, a vent pipe arranged within the tank and connected with the filling pipe and extending to a point adjacent the end of the tank at which the open end of the filling pipe is located and disposed a sufficient distance below the top of the tank to form a non-fillable void sufficient to cause the inner ends of both the filling pipe and the vent pipe to extend above the liquid level within the tank when the latter in inverted, and a conduit for drawing fuel from the tank extending into the tank adjacent said top portion near the fuel inlet and having an inlet located at the opposite end of the tank near the bottom thereof.

7. A liquid fuel tank for motor vehicles including a closed tank adapted to be normally supported on a vehicle in substantially horizontal position, a filling pipe located within the tank and having a leg portion extending the major portion of the length of the tank at the upper portion thereof and provided at one end with a lateral portion extending to the exterior of the tank, the other end of the leg portion being open and located adjacent to and spaced from one end of the tank, a vent pipe arranged in the tank and connected at one end with the filling pipe and extending therefrom to a point adjacent said end of the tank and located a sufficient distance below the top of the tank to form a nonfillable void sufficient to cause the inner ends of both the filling pipe and the vent pipe to extend above the liquid level within the tank when the tank is inverted, and means in the filling pipe for preventing outflow of liquid in case of complete overturn of the vehicle.

ALBERT E. HAAS.
GEO. H. CLAY.